United States Patent Office 3,717,933
Patented Feb. 27, 1973

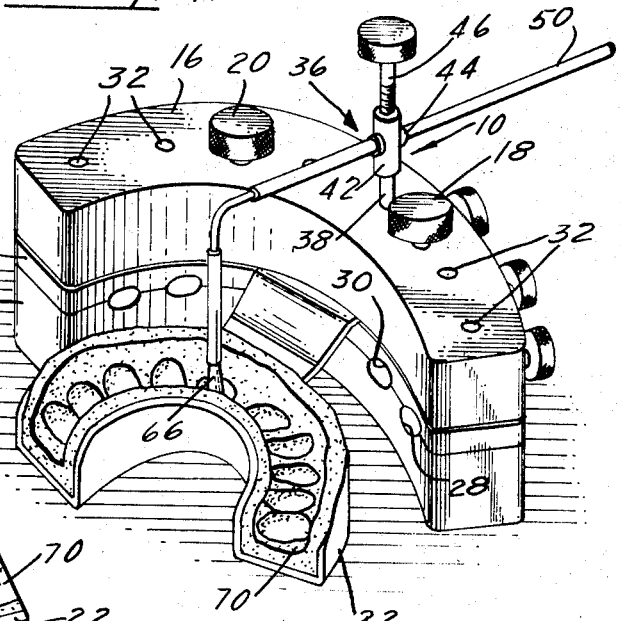
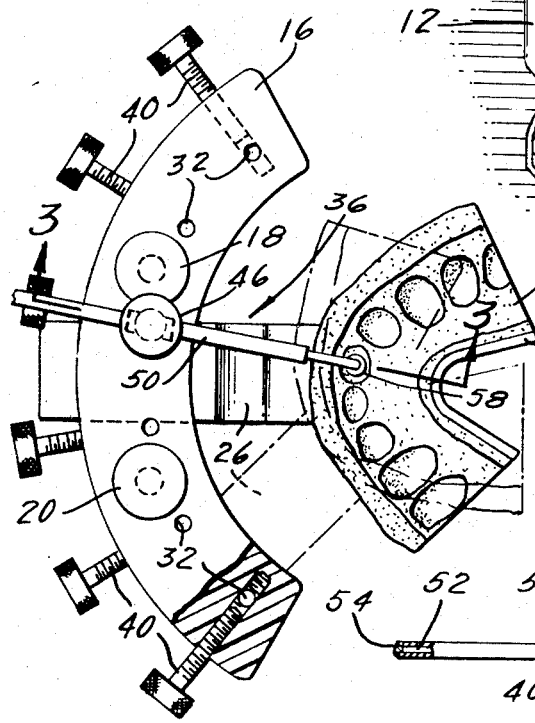
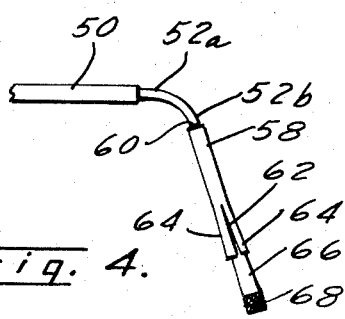
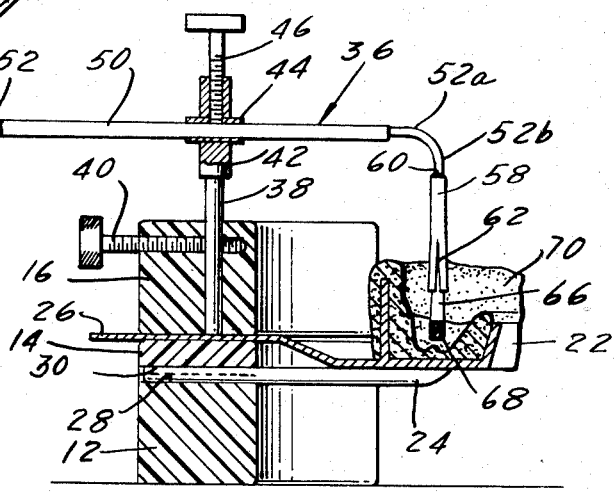

3,717,933
DENTAL APPARATUS
Denny W. Charron, 9361 Randall Ave.,
La Habra, Calif. 90631
Filed Nov. 1, 1971, Ser. No. 194,118
Int. Cl. A61c 13/00
U.S. Cl. 32—11                    6 Claims

ABSTRACT OF THE DISCLOSURE

A dental apparatus or jig for use in making dental restorations. There is support means having three parts for clamping a dental tray or impression holder in position and for the vertical rods of dowel pin holders and support means. Each dowel pin holder and support means comprises an assembly of a tubular member held in a horizontal position by a vertically adjustable rod, and a core secured in the tubular member, a free end of the core extending outwardly beyond the inner end of the tubular member and said free end is turned downwardly, there being a dowel pin clamp secured to the lower end of the down-turned free end portion for releasably holding a dowel pin. The exposed free end portion of the core is pliant and is easily bent to hold a dowel pin at a selected or required position or angle.

BACKGROUND OF THE INVENTION

Field of the invention

The present invention relates to restorative dental apparatus for preparing models of teeth for use in making crowns and bridges.

Description of the prior art

A model of a patient's teeth is made by first forming a negative impression of the teeth and, where there are negative impression, dowel pins are positioned in the center of the negative impressions of the teeth to be worked on. The negative impressions are then filled with a die material to form a positive replica or die of the teeth. After the die material has set the model is completed by casting a base stone integral with the die material to form a positive die of the teeth. A tooth to be worked on is separated from the model by cutting the die material and lifting the tooth die on the dowel pin from the base stone. The dowel pin facilitates handling the tooth die and repositioning it on the base stone.

Various difficulties have been encountered in carrying out this method of making dental models. Multiple adjustments of the apparatus used in this method are required, due to the accuracy required in positioning the dowel pins. Should the dowel pin be at a substantial angle from the vertical axis of the tooth impression, the model may be ruined when the tooth die is separated from the base stone. Other well known difficulties may also be encountered.

SUMMARY OF THE INVENTION

The present invention comprises support means or base assembly having three parts which serve to clamp a dental or impression tray in various operative positions. The support means is arcuate to better position the tray for greater accuracy in positioning dowel pins in impression material in the trays. Dental trays are supported by the support means at the inner side thereof, and there are a plurality of longitudinally-spaced, vertical holes or bores in the upper part of the support means or base.

Each dowel pin holder and support means comprises an assembly of a vertical rod receivable in a hole or bore in the base and adjustable vertically. At the upper end of the rod is an axially-aligned collar having a transversely-arranged, tubular sleeve, there being a tapped bore extending from the upper free end of the collar and through the sleeve for reception of a screw for securing in horizontal adjusted positions a horizontal tubular member with a core secured therein. The core has an end portion that extends beyond the free end of the tubular member and is down turned, said end portion being pliable so it can be bent and retain its bent position. A dowel pin clamp is attached to the free end of the pliant end portion of the core for releasably holding a dowel pin which is used in the usual well known manner.

One or more of the dowel pin holder and support means may be used, the rods thereof being disposed in respective holes or bores and adjustable vertically.

OBJECTS AND ADVANTAGES OF THE INVENTION

It is an object of the invention to provide dental apparatus for use in making dental restorations that is simple in construction and that practically anyone can learn to use with great accuracy.

Another object of the invention is to provide apparatus of this character that eliminates the necessity of making multiple adjustments, the present invention requiring but two hand adjustments.

Still another object of the invention is to provide apparatus of this character which will hold any kind of dental tray presently on the market.

A further object of the invention is to provide apparatus of this character whereby dental trays may be held in three different positions for setting dowel pins and pouring impressions.

A still further object of the invention is to provide apparatus of this character which does not contact the impression material.

Another object of the invention is to provide apparatus of this character that can use any type of dowel pin presently on the market, of which I am aware.

Still another object of the invention is to provide apparatus of this character that acts os its own support and also acts as a support for holding impressions in horizontal position, keeping the die stone level while setting.

Another object of the invention is to provide apparatus of this character that eliminates distortion by not allowing impression material to contact anything.

A still further object of the invention is to provide apparatus of this character with which custom made trays (without handles) are set into the apparatus by means of sticky wax or similar compounds without touching impression material so that the impression is not distorted.

The characteristics and advantages of the invention are further sufficiently referred to in connection with the following detailed description of the accompanying drawings, which represent one embodiment. After considering this example, skilled persons will understand that many variations may be made without departing from the principles disclosed and I contemplate the employment of any structures, or arrangements or modes of operation that are properly within the scope of the appended claims.

BRIEF DESCRIPTION OF THE DRAWINGS

Referring to the drawings, which are for illustrative purposes only:

FIG. 1 is a perspective view of the apparatus holding an impression or dental tray in position with a dowel pin holder assembly holding a dowel pin in operative position;

FIG. 2 is to top plan view thereof;

FIG. 3 is a sectional view taken on line 3—3 of FIG. 2; and

FIG. 4 is an enlarged view of the inner end of the tubular member of the dowel pin holder and support means showing the dowel pin clamp with a dowel pin therein at an angle from the vertical.

DESCRIPTION OF THE PREFERRED EMBODIMENT

Referring more particularly to the drawings, there is shown support means, indicated generally at 10, having a lower part 12, an intermediate part 14 and a top part 16. There are a pair of bores extending through the parts with the portion of the bore in the lower part 12 tapped, the parts of the bores in the intermediate and top parts of the support means being untapped and adapted to slidably receive screws 18 and 20. Screws 18 and 20 may be tightened and loosened and when tightened are adapted to clampingly secure a dental tray 22. One type of dental tray 22 is shown in the drawings and is of well known character. This tray has a pair of prongs 24 and spaced above these prongs is a tongue 26. The lower part 12 of the support means has several pairs of notches 28 spaced apart relative to each other and the pairs are spaced apart longitudinally of the support means. The adjacent side of the intermediate part has similar notches 30. The prongs 24 of the tray 22 are received in a pair of the notches 28 and 30, and the tongue 26 extends from the inner side of the support means between the intermediate part and the upper or top part. When the screws 18 are tightened the prongs and the tongue of the tray 22 are firmly clamped in the support means, it being noted that the tray is at the inner or concave side of the support means and spaced upwardly of the plane of the bottom of the lower part. By having several pairs of the notches 28 and 30 spaced apart longitudinally of the support means, the dental tray may be placed in several positions with respect to the support means for greater convenience and accuracy in positioning the dowel pins, depending upon the portion of the impression in which the dowel pin or dowel pins must be placed. There are a plurality of vertical holes or bores 32 in at least the upper part 16 of the support means, these holes or bores being spaced apart longitudinally relative to said support means.

One or more dowel pin holders and support means may be used. Since each of these dowel pin holders and support means are the same only one has been shown in the drawings and will be described.

The dowel pin holder and support means is indicated generally at 36 and comprises an assembly of the vertical rods 38 for slidable and adjustable disposition in one of the holes or bores 32. There is a tapped bore normal to each of the holes 32 for reception of a screw 40 for engagement with the respective rods 38 for securing said rods in respective adjusted positions.

The dowel pin holder and support means also includes a collar or sleeve holder 42 secured to the upper end of the rod 38 and in axial alignment therewith. The sleeve holder or collar has a transverse bore in which is secured a sleeve 44. Sleeve 44 may be secured in the sleeve holder or collar 42 by soldering or by any other suitable means. A portion of the sleeve holder or collar extends upwardly of the sleeve 44 and there is a tapped bore which extends from the upper end of the collar and through the sleeve holder, there being as crew 46 in said tapped bore. The dowel pin holder and support means assembly also includes a tubular member 50 horizontally slidable in the sleeve 44 and said tubular member is releasably secured in horizontally adjusted positions by the screw 46. Within the tubular member 50 there is a core 52 of pliant material such as, for example, copper. The outer end of the core terminates adjacent the outer end of the tubular member 50 and is secured in the tubular member by solder 54 or any other suitable means. A free end portion 52a of the core extends beyond the inner end of the tubular member and is turned downwardly so that there is a generally vertical lower end portion 52b which extends into the upper end of a dowel pin clamp 58, the parts being secured together by any suitable means such as, for example, soldering as at 60. The dowel pin clamp has a longitudinally-extending bore and at its lower end there are a pair of diametrically-positioned slits 62, thereby providing a pair of oppositely-arranged jaws 64 which are somewhat resilient so that they may spread apart somewhat when a dowel pin is inserted in the lower end of said dowel pin clamp, the jaws 64 firmly but releasably clamping a dowel pin in the dowel pin holder at the lower end thereof.

A dowel pin 66 is shown in the dowel pin holder in operative position, the dowel pin being tapered upwardly with the upper end of smaller diameter than the inside of the adjacent or lower end of the dowel pin clamp. The tapering of the dowel pin is such that an intermediate part of said dowel pin is of greater outside diameter than the inside diameter of the dowel pin clamp and, thus, is frictionally held between the jaws of the dowel pin clamp. At its larger end the dowel pin has a reduced-diameter part 68 which is knurled. One side of the tapered part of the dowel pin is flattened in the usual manner. Dowel pins are well known and any type of dowel pin may be used with the present instrument or apparatus.

It is desirable that the dowel pins be arranged in axial alignment with a tooth of a restoration and, generally, in a substantially vertical position. However, there may be situations wherein the dowel pin must be at a slight angle relative to the vertical and may be positioned accordingly by bending the pliant part 52a of the core, as shown in FIG. 4.

In the present disclosure the impression material in the tray is indicated at 70 and is of the usual well known character.

The general procedure for making restoration is followed with the present invention which provides advantages over prior art equipment, some of said advantages being set forth at the early part of this specification.

The invention and its attendant advantages will be understood from the foregoing description and it will be apparent that various changes may be made in the form, construction and arrangement of the parts without departing from the spirit or scope thereof or sacrificing its material advantages, the arrangement hereinbefore described being merely by way of example and I do not wish to be restricted to the specific form shown or uses mentioned except as defined in the accompanying claims.

I claim:

1. Dental apparatus for use in making dental restorations, comprising:
 (A) clamping means comprising three horizontal, arcuate matching parts, for clamping a part of a dental tray therebetween at one side clamping means, said clamping means also including means for releasably tightening said clamping parts, said clamping parts comprising an upper part, lower part, and intermediate part, said top part having a plurality of vertical holes therein spaced apart longitudinally of the clamping means, said clamping means having tapped bores communicating with respective vertical holes, and screws threadably received in said bores;
 (B) at least one dowel pin holder and support means including a rod having one end adjustably receivable in a vertical hole in said top part of said clamping means, the screw for said hole being for releasably securing the rod in vertical adjustable positions in said hole;
 (C) a horizontal member having a connection with said rod and spaced upwardly of the top of the clamping means, said member being horizontally adjustable;
 (D) means for securing the horizontal member in adjusted positions;
 (E) a pliant connecting element secured to one end of the horizontal member with at least a part extending beyond one end of the horizontal member and at least an end portion of said pliant element extending downwardly relative to the horizontal member;

(F) and a dowel pin clamp secured to the lower end of the free end of the pliant element, said dowel pin clamp being adapted for releasably holding a dowel pin.

2. The invention defined by claim 1, wherein tongues of dental trays may be clamped between the top part and the intermediate part of the clamping means.

3. The invention defined by claim 1, wherein there is a sleeve holder at the upper end of the rod of the dowel pin holder and support means; a sleeve disposed transversely in an opening provided therefore in the sleeve holder, said sleeve holder having a tapped bore extending from its upper free end through the sleeve; and a screw threadably disposed in said tapped bore for releasably securing the horizontal member of the dowel pin holder and support means in horizontally-adjusted positions.

4. The invention defined by claim 1, wherein the horizontal member is tubular and the pliant element comprises a core extending through the tubular member and secured therein, the opposite end of said pliant element being the part extending beyond one end of the horizontal member.

5. The invention defined by claim 4, wherein the outer end of the core terminates adjacent the outer end of the tubular member and this core end is soldered to the end of the tubular member.

6. The invention defined by claim 1, wherein tongues of dental trays may be clamped between clamping parts of the clamping means.

References Cited
UNITED STATES PATENTS

| | | | |
|---|---|---|---|
| 3,552,018 | 1/1971 | Zahn | 32—11 |
| 2,836,849 | 6/1958 | Humphrey | 32—11 |

ROBERT PESHOCK, Primary Examiner

U.S. Cl. X.R.

32—40